United States Patent
Kishi et al.

(10) Patent No.: US 6,621,992 B2
(45) Date of Patent: Sep. 16, 2003

(54) COPIER OPERATION CONTROL AND INPUT DEVICE

(75) Inventors: Nobuya Kishi, Yamatokoriyama (JP); Yasumasa Arimitsu, Nara (JP); Kenji Tanaka, Uji (JP)

(73) Assignee: Sharp Kabushiki Kaisha (JP)

( * ) Notice: Subject to any disclaimer, the term of this patent is extended or adjusted under 35 U.S.C. 154(b) by 0 days.

(21) Appl. No.: 10/279,194

(22) Filed: Oct. 23, 2002

(65) Prior Publication Data
US 2003/0039482 A1 Feb. 27, 2003

Related U.S. Application Data

(62) Division of application No. 09/684,297, filed on Oct. 6, 2000, now Pat. No. 6,526,241.

(30) Foreign Application Priority Data

Oct. 13, 1999 (JP) ............................................. 11-291573

(51) Int. Cl.[7] .............................................. G03G 15/00
(52) U.S. Cl. ............................................ 399/81; 399/83
(58) Field of Search ............................ 399/75, 81, 82, 399/85, 86, 370, 376, 389; 39/83

(56) References Cited

U.S. PATENT DOCUMENTS 5,614,993 A  * 3/1997  Smith et al. ................... 399/81
5,768,677 A  * 6/1998  Natsume ..................... 399/81 X
5,937,232 A    8/1999  Taguchi et al. ................ 399/81
5,950,045 A    9/1999  Nomura et al. ................ 399/81

FOREIGN PATENT DOCUMENTS

JP          02-058068          2/1990
JP          05127472           5/1993

* cited by examiner

*Primary Examiner*—Hoan Tran
(74) *Attorney, Agent, or Firm*—John J. Penny, Jr.; Edwards & Angell, LLP; David G. Conlin

(57) ABSTRACT

Four original size and paper size combinations are displayed together with arrow indicators on a display panel, in order of use frequency. Each size is displayed by text and pattern and enlargement or reduction with the necessity of rotation also indicated. By operating scroll keys, the display of the arrows in the arrow indicators moves from one to another while the display of four possible original size and paper size combinations among all the possible combinations is shown in a scrolling manner. The operator operates the scroll keys to scroll the four combinations displayed within the display panel and selects the arrow indicator indicating the arrow that corresponds to the desired combination to be set up for the copying operation.

2 Claims, 11 Drawing Sheets

| Combination No. | Combination content | Number of times of use |
|---|---|---|
| 1 | A4→A4 | |
| 2 | A4→B4 (Rotate and Enlarge) | |
| 3 | A4→A3 (Rotate and Enlarge) | |
| 4 | A4→B5(Reduce) | |
| ⋮ | ⋮ | |
| n | B5→B5 | |
| n+1 | B5→A4(Enlarge) | |
| n+2 | B5→B4 (Rotate and Enlarge) | |
| n+3 | B5→A3 (Rotate and Enlarge) | |
| ⋮ | ⋮ | |
| m | B4→B4 | |
| m+1 | B4→A4 (Rotate and Reduce) | |
| m+2 | B4→A3(Enlarge) | |
| m+3 | B4→B5 (Rotate and Reduce) | |
| ⋮ | ⋮ | |
| x | A3→A3 | |
| x+1 | A3→A4(Reduce) | |
| x+2 | A3→B4(Reduce) | |
| x+3 | A3→B5 (Rotate and Reduce) | |
| ⋮ | ⋮ | |

FIG. 5

| Use frequency No. | Combination No. |
|---|---|
| 1 | 1 |
| 2 | m |
| 3 | x |
| 4 | n |
| 5 | m+1 |
| 6 | 2 |
| 7 | x+1 |
| 8 | 3 |
| 9 | n+1 |
| 10 | 4 |
| ⋮ | ⋮ |

FIG. 6

COPIER OPERATION CONTROL AND INPUT DEVICE

This application is a divisional of U.S. application Ser. No. 09/684,297, filed Oct. 6, 2000 (now U.S. Pat. No. 6,526,241 the contents of which are incorporated herein by reference.

BACKGROUND OF THE INVENTION (1) Field of the Invention

The present invention relates to a copier operation control and input device provided for a copier capable of duplicating enlarged-size or reduced-size copies of an original image, more detailedly relates to a copier operation control and input device for receiving the input of an original size and paper size combination involved in a copying operation.

(2) Description of the Prior Art

Conventionally, there have been a variety of copiers put on the market, which have the zooming function for permitting change in copy magnification so as to allow an original image to be enlarged or reduced and reproduced on copy paper of a desired size. In a copier having such a zooming function, it is necessary to designate the copy magnification in accordance with the original size and the desired copy image size, prior to the copy operation. However, since the copier typically reads a plurality of original sizes using the image reader while multiple sizes of paper can be fed from the paper feed portion, there are various original size and paper size possible combinations so that it is not easy to set the desired copy magnification according to the original size and paper size.

As conventional copiers having a zooming function, various means for designating the copy magnification in accordance with the original size and copy image size have been proposed. For example, Japanese Patent Application Laid-Open Hei 5 No.127472 discloses a configuration having a copy magnification display portion 61 as shown in FIG. 1, where a number of original sizes are shown in the row of an original size display portion 62 and a number of copy magnification ratios are shown in the column of a copy magnification portion 63 so as to create a copy size display portion 65 for displaying the paper sizes at the cells designated by the intersections between original sizes and copy magnification ratios.

In this arrangement, this disclosure suggests that upon designating the copy magnification the operator should be able to easily select the necessary copy magnification, not paying simultaneous attention to the display contents vertically and horizontally in the display means, but by vertically searching the cells of the column, designated by the original size involved in the copying operation, in original size display portion 62 of copy magnification display means 61, locating the cell in which the desired copy size is displayed in copy size display portion 65, and checking the copy magnification displayed in the row.

However, the arrangement disclosed in Japanese Patent Application Laid-Open Hei 5 No. 127472 necessitates the operator to designate the paper size to be used, other than the designation of the copy magnification, posing the drawback that the setup of the copying conditions upon the start of the copying operation is complicated.

Further, if there are many choices of original and copy sizes, the work for locating the original size from the original size display portion, that for vertically searching the cells of the column with the original size displayed and that for locating the desired copy size, and that for horizontally following the row in which the copy size is displayed are rather troublesome so that the copy magnification setting by itself is not so easy.

SUMMARY OF THE INVENTION

It is therefore an object of the present invention to provide a copier operation control and input device which facilitates designation of the copy magnification and paper size by a single step of operation even if there are many selectable original and copy sizes, by displaying the permissible original size and paper size combinations, in order of priority based on the use history.

In order to achieve the above object, the present invention is configured as follows:

In accordance with the first aspect of the present invention, an operation control and input device for a copier, includes:

a display portion for displaying a plurality of original size and paper size combinations;

an operation control portion for receiving modifying operations of the display content in the display portion and for receiving the selection control of one original size and paper size combination from the plural combinations; and a controller which, based on the modifying operation of the display content via the operation control portion and based on use history for individual combinations stored beforehand, displays the original size and paper size combinations, in order of the possibility of being selected, and sets up the copying conditions based on the selection control by means of the operation control portion.

In accordance with the second aspect of the present invention, the operation control and input device for a copier having the above first feature is characterized in that the controller displays a predetermined number of combinations selected from multiple original size and paper size combinations, in scrolling manner, based on the modifying operation of the display content via the operation control portion.

In accordance with the third aspect of the present invention, the operation control and input device for a copier having the above first feature is characterized in that the controller renews and stores the use history of use frequencies of individual original size and paper size combinations so as to display in the display portion the combinations in accordance with the control via the operation control portion, in order of use frequency.

In accordance with the fourth aspect of the present invention, the operation control and input device for a copier having the above first feature is characterized in that the controller displays in the display portion only the combinations involving the original size read from the original set in the copying machine.

In accordance with the fifth aspect of the present invention, the operation control and input device for a copier having the above first feature is characterized in that the controller displays in the display portion only the combinations involving the paper sizes accommodated in the copying machine.

In accordance with the sixth aspect of the present invention, the operation control and input device for a copier having the above first feature is characterized in that the controller renews and stores the use frequency of each combination as the use history.

In accordance with the seventh aspect of the present invention, the operation control and input device for a copier having the above first feature is characterized in that the controller displays the combination which was used last in preference to the combinations of which the display order has been determined based on the stored use frequencies.

In the above first configuration, a multiple number of original size and paper size combinations are displayed in the display portion based on the modifying operation of the display content via the operation control portion and based on the use history of individual combinations. When one from the size combinations displayed in the display portion is selected using the operation control portion, copying conditions in conformity with the selected combination is set up. Therefore, the operator is able to select the desired original size and paper size combination from the multiple number of size combinations displayed in the display portion, thus making it possible to set up the copy magnification and the paper size in a simple manner. Further, the multiple number of original size and paper size combinations are displayed in order of the possibility of being selected based on the use history of the individual combinations, this feature facilitates quick selection of the desired combination. Therefore, it is possible to make quick and easy choice of the desired combination even if there are various selectable original size and paper size combinations.

In the above second configuration, when the display content is modified via the operation control portion, the predetermined number of original size and paper size combinations are displayed in a scrolling manner. Therefore, even if there are various selectable original size and paper size combinations, only the fixed number of combinations are displayed in the display portion, which enables easy selection via the operation control portion.

In the above third configuration, a multiple number of original size and paper size combinations are displayed in the display portion in order of use frequency, based on the modifying operation of the display content via the operation control portion. Therefore, even if there are various selectable original size and paper size combinations, it is possible to set up the desired combination quickly and easily by appropriate control of the operation control portion.

In the above fourth configuration, among the selectable original size and paper size combinations, only the combinations having the original size involved in the copying operation are displayed. Therefore, no unselectable combinations will be displayed so that the selecting operation via the operation control portion can be simplified even if there are various selectable original size and paper size combinations.

In the above fifth configuration, among the selectable original size and paper size combinations, only the combinations having the paper sizes capable of being used for the copying operation are displayed. Therefore, no unselectable combinations will be displayed so that the selecting operation via the operation control portion can be simplified even if there are various selectable original size and paper size combinations.

In the above sixth configuration, a multiple number of selectable original size and paper size combinations are displayed in the display portion in order of use frequency. Therefore, among the multiple number of selectable combinations, the combinations which have been frequently used are displayed in the display portion in order of possibility of being selected. Accordingly, the number of operating the operation control portion for displaying the desired combination in the display portion can be reduced, whereby the modifying operation of the display content via the operation control portion can be simplified.

In the above seventh configuration, the combination of the last copying operation is displayed in the display portion in preference to other combinations even if the combination is used less frequently. Therefore, if the operator makes multiple times of copying operations in a row, the combination is displayed at the top in the display portion as the candidate of the original size and paper size combination to be used in the second and following copying operations, regardless of the use frequency of the combination. This feature enables the operator to perform quick selection and control of the desired combination.

The gist of the present invention has been described heretofore, but needless to say, the present invention can be achieved by appropriate combinations of these features.

BRIEF DESCRIPTION OF THE DRAWINGS

FIG. 5 is a chart showing the stored contents in a combination table provided for the controller of the copier;

FIG. 6 is a chart showing stored contents in use history manager provided for the controller of the copier;

DESCRIPTION OF THE PREFERRED EMBODIMENTS

Figure 1:
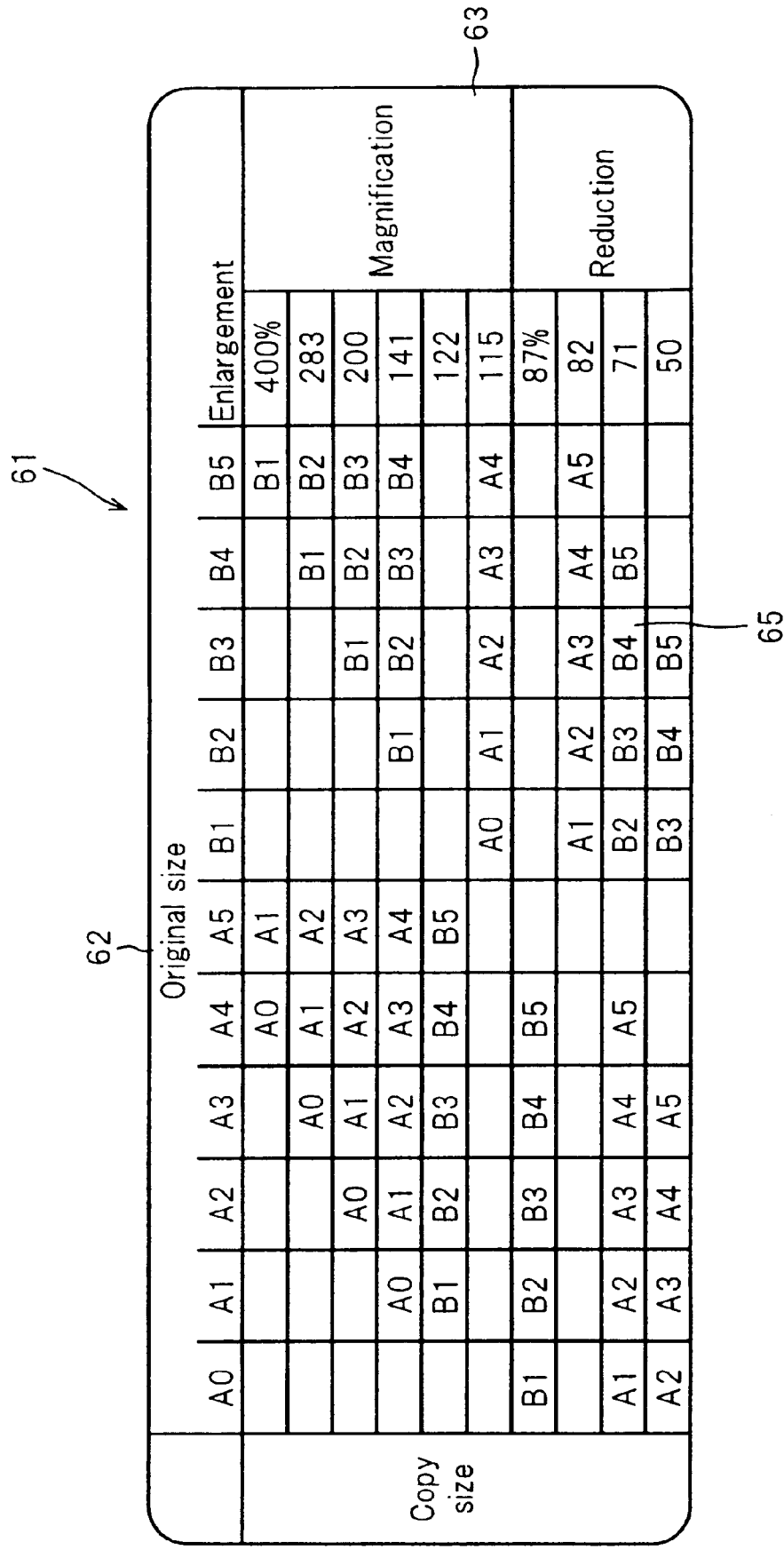
FIG. 1 is a plan view showing a copy magnification display means as an example configuration of a conventional copier having a zooming function.
Figure 2:
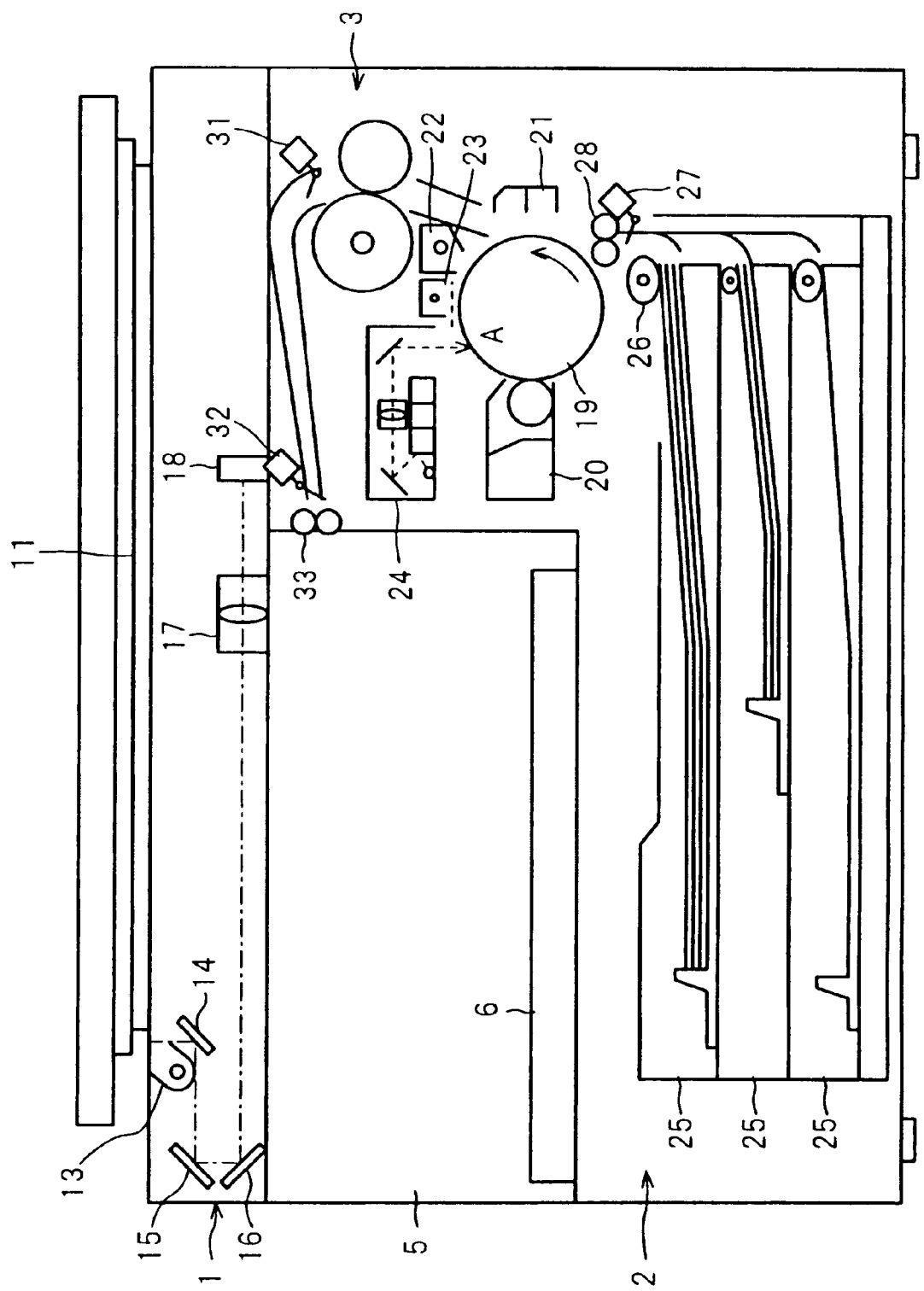
FIG. 2 is a schematic front sectional view showing the configuration of a copier having an operation control and input device in accordance with the first embodiment of the present invention.

FIG. 2 is a schematic front sectional view showing the configuration of a copier having an operation control and input device in accordance with the first embodiment of the present invention. A copying machine 10 includes a scanner portion 1, a paper feed portion 2 and image forming portion 3. Scanner portion 1 located in the upper part of copying machine 10 has an original table 11, a copy lamp 13, mirrors 14 to 16, a zoom lens 17 and a photoelectric transducer (to be referred to as CCD hereinbelow) 18. Placed on the top surface of original table 11 is an original cover 12 which can be opened and closed. Copy lamp 13 and mirror 14 move in a reciprocating manner at a constant speed along the undersurface of original table 11 so as to illuminate the image face of the original being placed on original table 11 with light from copy lamp 13. Mirrors 15 and 16 also reciprocate along the undersurface of original table 11 at half the speed of copy lamp 13 and mirror 14. The light emitted from copy lamp 13 and reflected by the image face of the original is lead to zoom lens 17 by way of mirrors 14 to 16. Zoom lens 17 focuses the thus lead, reflected light on CCD 18. CCD 18 receives the reflection of light from the image face of the original and outputs image data in terms of voltage in accordance with the received amount of light.

Paper feed portion 2 has a plurality of paper feed cassettes 25 mounted therein, each holding sheets of paper of a different size. A photosensitive drum 19 having a photoconductive layer on the surface thereof is supported rotatably in image forming portion 3. Arranged around this photosensitive drum 19 are a charger 23, an exposure unit 24, a developing unit 20, a transfer device 21 and a cleaner 22, in this order. Charger 23 supplies charge of a single polarity uniformly onto the surface of photosensitive drum 19. Exposure unit 24 radiates laser light modulated in accordance with the image data on the photosensitive drum 19 surface to thereby form a static latent image thereon. Developing unit 20 supplies the developer to the static latent image to form a visual, developer image. By the functions of a feed roller 26, a sensor 27 and a registration roller 28, paper feed portion 2 feeds paper, sheet by sheet, into and between photosensitive drum 19 and transfer device 21, in synchronism with the rotation of photosensitive drum 19. Transfer device 21 transfers the developer image from the photosensitive drum 19 surface to the paper surface, by electrostatic force. The paper with the developer image transferred thereon is fed to fixing roller 29 where it is heated and pressed so that the developer image is firmly fixed to the paper surface. The thus image fixed paper is discharged by means of a discharge roller 33 onto a paper output tray 6.

In this way, the paper conveyance path is created from paper feed portion 2, passing through the space between photosensitive drum 19 and transfer device 21 in image forming portion 3 and fixing unit 29, to a space 5 where paper output tray 6 is arranged. This paper conveyance path is provided with detector switches 31 and 32 which detect the passing of the paper.

Figure 3:
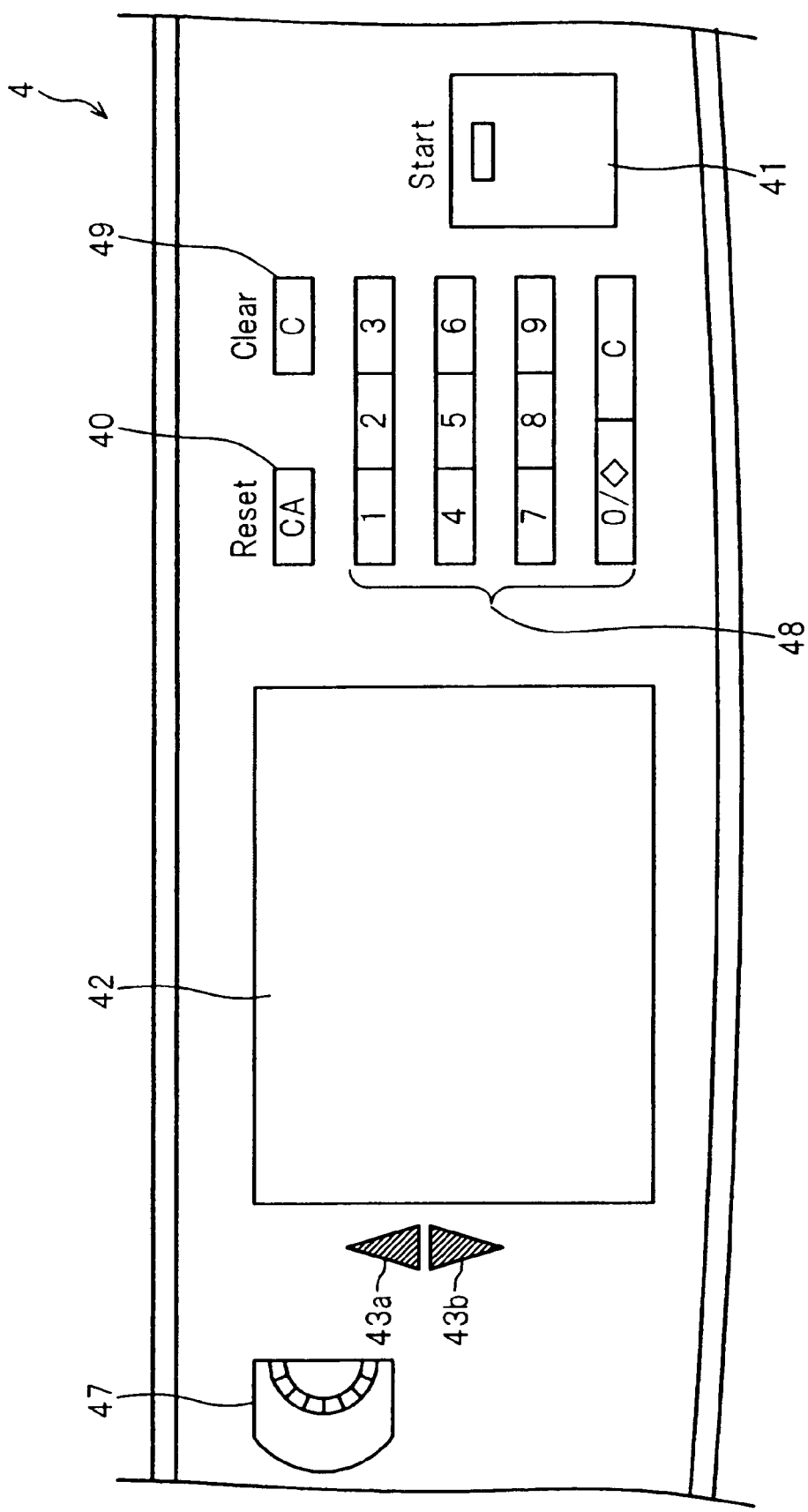
FIG. 3 is a plan view showing a part of a control panel of the copier.

FIG. 3 is a plan view showing part of the control panel of the same copier. A control panel 4 is arranged on the top and the front side of copying machine 10. This control panel 4 has a display panel 42 of a LCD device arranged in the center thereof. A numeric keypad 48, a start key 41, a clear key 49 and a reset key 40 are arranged on the right side of the display. Arranged on the left side of display panel 42 are a dial 47, scroll keys 43*a* and 43*b*.

Numeric keypad 48 permits numeric input to be displayed on the screen of display panel 42. Start key 41 permits the start command of a copying operation. Clear key 49 is used to clear the numerals displayed on display panel 42 or command interruption of any copying operation being in progress. Reset key 40 is operated to reset the setup contents of copying conditions such as copy magnification, paper size, image density, etc., to the default values. Dial 47 is operated to control the luminosity of display panel 42. Scroll keys 43*a* and 43*b* are operated when the display content on display panel 42 needs to be scrolled. Display panel 42 displays various frames including control guidance frames, warning frames etc., changing from one frame to another.

Figure 4:
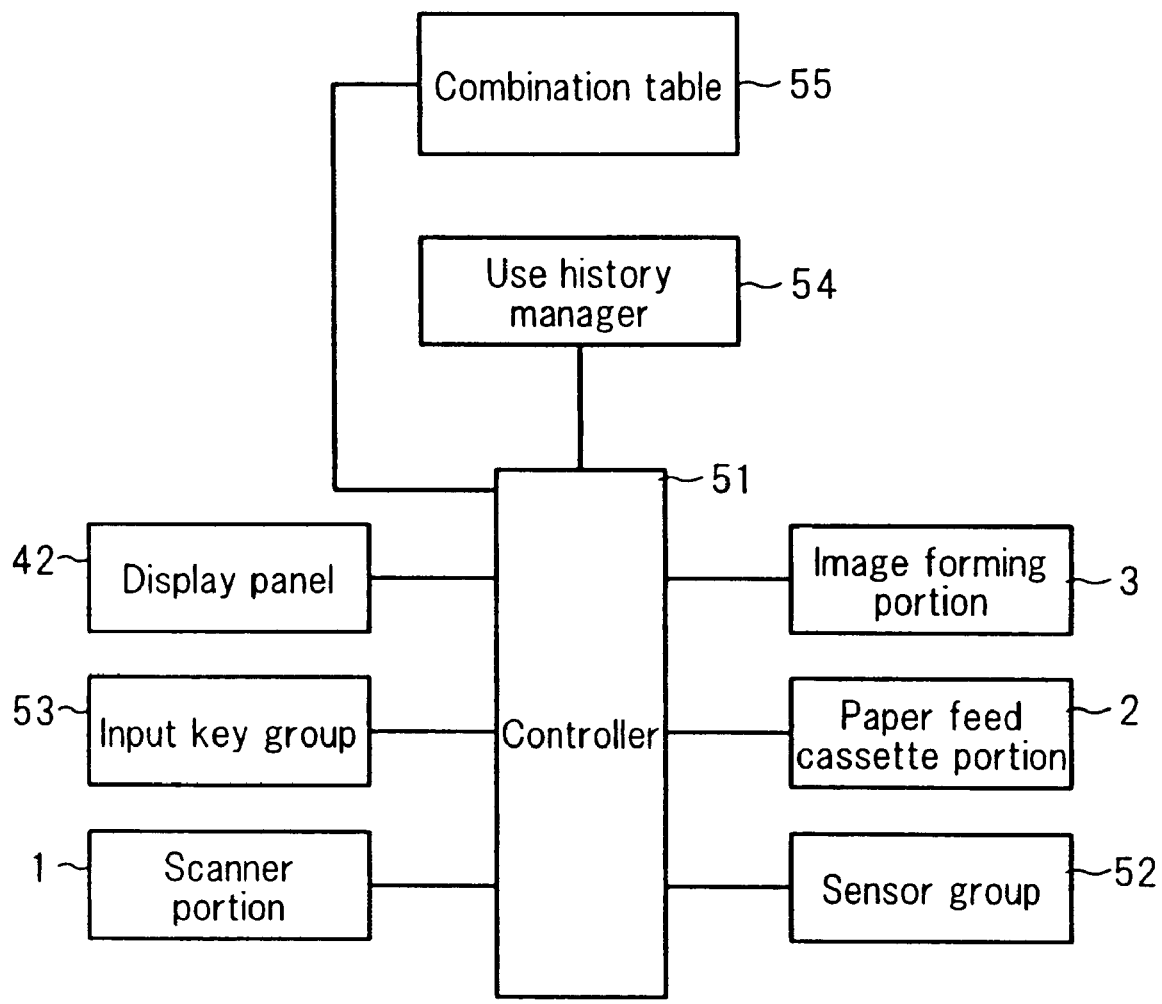
FIG. 4 is a block diagram showing the essential configuration of the controller of the copier.

FIG. 4 is a block diagram showing the essential configuration of a controller of the copier. A controller 51 of copying machine 10 is a central processor including a CPU, to which scanner portion 1, paper feed portion 2, image forming portion 3, display panel 42, an input key group 53, a sensor group 52, a use history manager 54, a combination table 55 are connected. Controller 51 outputs control signals to power circuits, motors, clutches for driving copy lamp 13, mirrors 14 to 16 and zoom lens 17 in scanner portion 1 and receives the input of received optical data from CCD 18. Further, controller 51 outputs control signals to the motors and clutches for driving paper feed roller 26 and registration roller 28 of paper feed portion 2 and also outputs control signals to the motors, power units, clutches for driving photosensitive drum 19, charger 23, exposure unit 24, developing unit 20, transfer device 21 and fixing unit 29 in image forming portion 3.

Controller 51 controls the operation of copying machine 10 in accordance with the setup conditions through input key group 53 including numeric keypad 48, etc. in control panel 4 and displays the data on the display panel 42. With this arrangement, the operator is able to review the display contents on display panel 42 so as to recognize the current operation state and setup conditions of copying machine 10.

As shown in FIG. 5, combination table 55 stores the original size and paper size combinations in relation with corresponding combination numbers and also stores the count of the number of times of use. More specifically, each time a copying operation has been performed, controller 51 increments the count of the number of times of use of the original size and paper size combination which was used in the last copying operation, in combination table 55.

Use history manager 54, as shown in FIG. 6, stores the relationship between the use frequency number and the combination number. The use frequency number is the increasing integer, allotted for each original size and paper size combination, in order of the use frequency of the past copying operations. Specifically, the combination corresponding to the combination number related to the use frequency number '1' is the most frequent one and, the greater the use frequency number, the lower the use frequency. Controller 51, each time the copying operation is completed, refers to the stored contents of combination table 55 after the renewal of the count values of the number of times of use and appropriately modifies the relationship between the use frequency number and the combination number in accordance with the stored contents of combination table 55.

The content of the combinations shown in combination table 55 not only includes information as to enlargement or reduction between the original size and the paper size but also includes information as to the rotation of the image data of the original. The rotation of the image data indicates a rotation of image data by 90 degrees within the horizontal plane and is performed so that the longitudinal direction of the image data and that of the paper correspond.

Controller 51 reads out from use history manager 54 the relationships between use frequencies and the combination contents and displays original size and paper size combinations on display panel 42, in order of use frequency.

Figure 7:
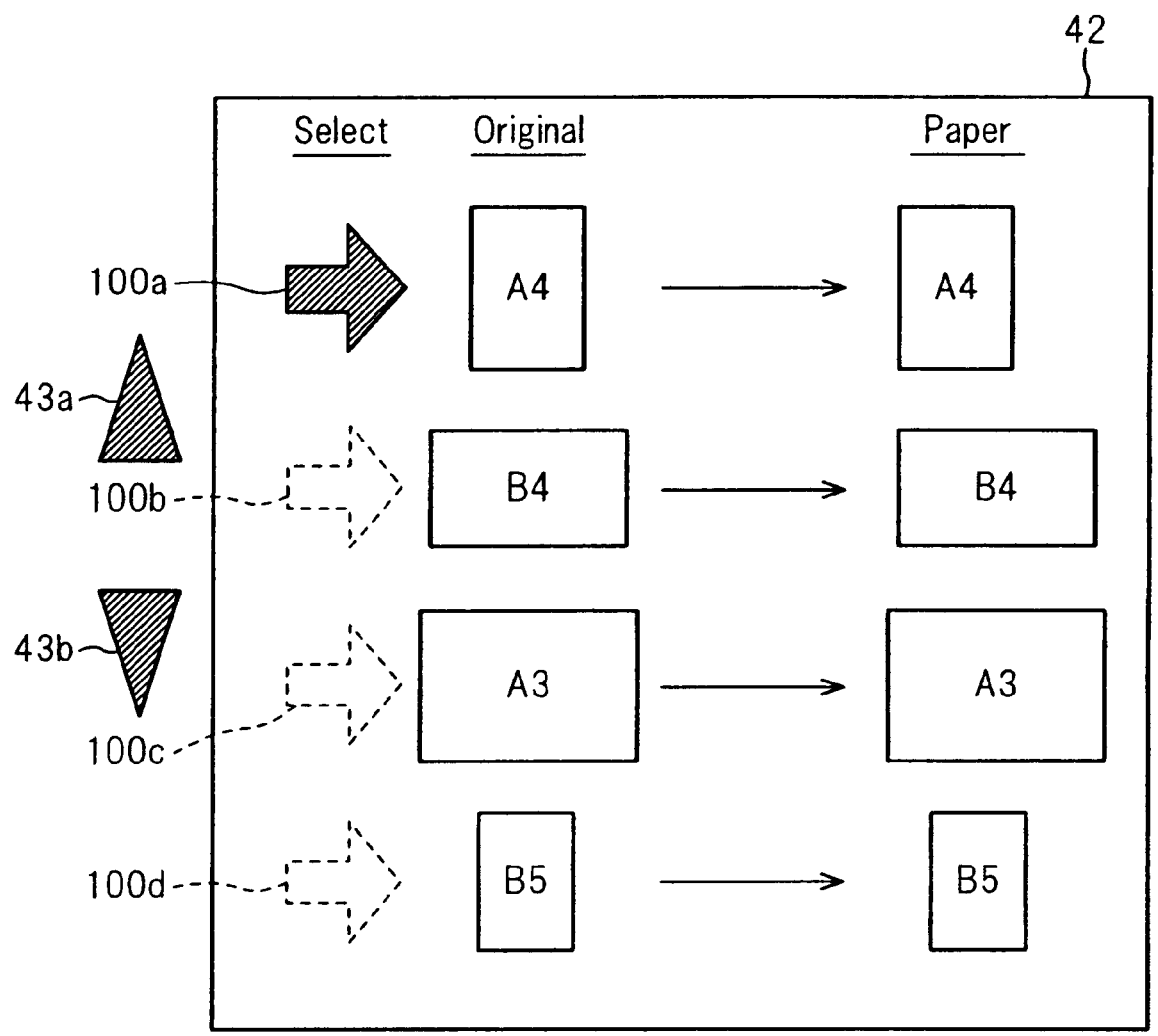
FIG. 7 is a diagram showing an example of a setup frame for setting up an original size and paper size combination in the display panel.

FIG. 7 is a diagram showing an example of a combination setup frame of original size and paper size in the display panel. In this example, four combinations are displayed on display panel 42 vertically in the combination setup frame of original size and paper size. For example, suppose that copying operations have been carried out more frequently in the order listed, i.e., A4 size isometric copy, B4 size isometric copy, A3 size isometric copy and B5 size isometric copy, the combination of A4 size original and A4 size paper, the combination of B4 size original and B4 size paper, the combination of A3 size original and A3 size paper and the combination of B5 size original and B5 size paper will be shown in this order from the top to the bottom. Here, four combinations are displayed on display panel 42 but this should not limit the present embodiment.

Arranged on the left side of each combination is an arrow indicator 100a through 100d for display an arrow. By operating scroll keys 43a and 43b, one of arrow indicators 100a to 100d is selectively displayed on the left side of the selected combination. When the arrow in the top arrow indicator 100a is displayed as shown in FIG. 7, this indicates the state where the combination of A4 size original and A4 size paper is selected. If down-arrow scroll key 43b is pressed in this condition, the arrow being displayed in the top arrow indicator 100a disappears and the arrow in the second to top, arrow indicator 100b becomes displayed so as to display the state where the combination of B4 size original and B4 size paper is selected.

In the case where the arrow in the bottom, arrow indicator 100d is displayed in the display state shown in FIG. 7, if down-arrow scroll key 43b is operated, the text and patterns representing the combination of A4 size original and A4 size paper in the first place in order of use frequency disappears from display panel 42 and the second to fourth combinations in order of use frequency shift up and the text and patterns representing the fifth combination of the original size and paper size in order of frequency appears in the lowest row. In this case, the arrow in the bottom, arrow indicator 100d corresponding to the fifth combination in order of use frequency is displayed.

When up-arrow scroll key 43a is pressed down from this situation, the arrow in arrow display indicator 100c, 100b or 100a is selectively displayed sequentially in this order, depending on the number of times of pressing. In the state where the arrow in the top, arrow indicator 100a corresponding to the second combination in order of use frequency of B4 size original and B4 size paper is displayed, if up-arrow scroll key 43a is pressed down, the arrow in the top, arrow indicator 100a remains as is while the text and patterns which are displayed at the bottom and represents the original size and paper size of the fifth combination in order of use frequency disappears from display panel 42 and the text and patterns representing the first combination of A4 size original and A4 size paper in order of use frequency becomes displayed in the top row on display panel 42.

In this way, plural original size and paper size combinations are displayed on display portion 42, in order of use frequency, the display content on display panel 42 is scrolled by controller 51, following the control of scroll keys 43a and 43b. Controller 51, when start key 41 in the control panel 4 is operated, performs the copying operation in accordance with the combination at the position where the arrow indicator displays its arrow.

To sum up, controller 51 recognizes that the combination located corresponding to the arrow indicator displaying its arrow in display panel 42 should have been selected by the operator, causes scanner portion 1 to read the original image within the range of the original size according to the selected combination, effects the image forming process in image forming portion 3 with the copy magnification determined by the selected original size and paper size combination, and causes paper feed portion 2 to feed paper of the size according to the selected combination. Accordingly, the operator only needs to select the desired original size and paper size combination by operating scroll keys 43a and 43b and then operate start key 41 to start the desired copying operation quickly and easily without the necessity of selection based on the numeral of the copy magnification.

In connection with the above, when scroll key 43a or 43b is pressed down for longer than a predetermined time, controller 51 scrolls the arrow indicators that display the arrows or the original size and paper size combinations displayed on display panel 42, after passage of a certain amount of time pressed.

Figure 8:
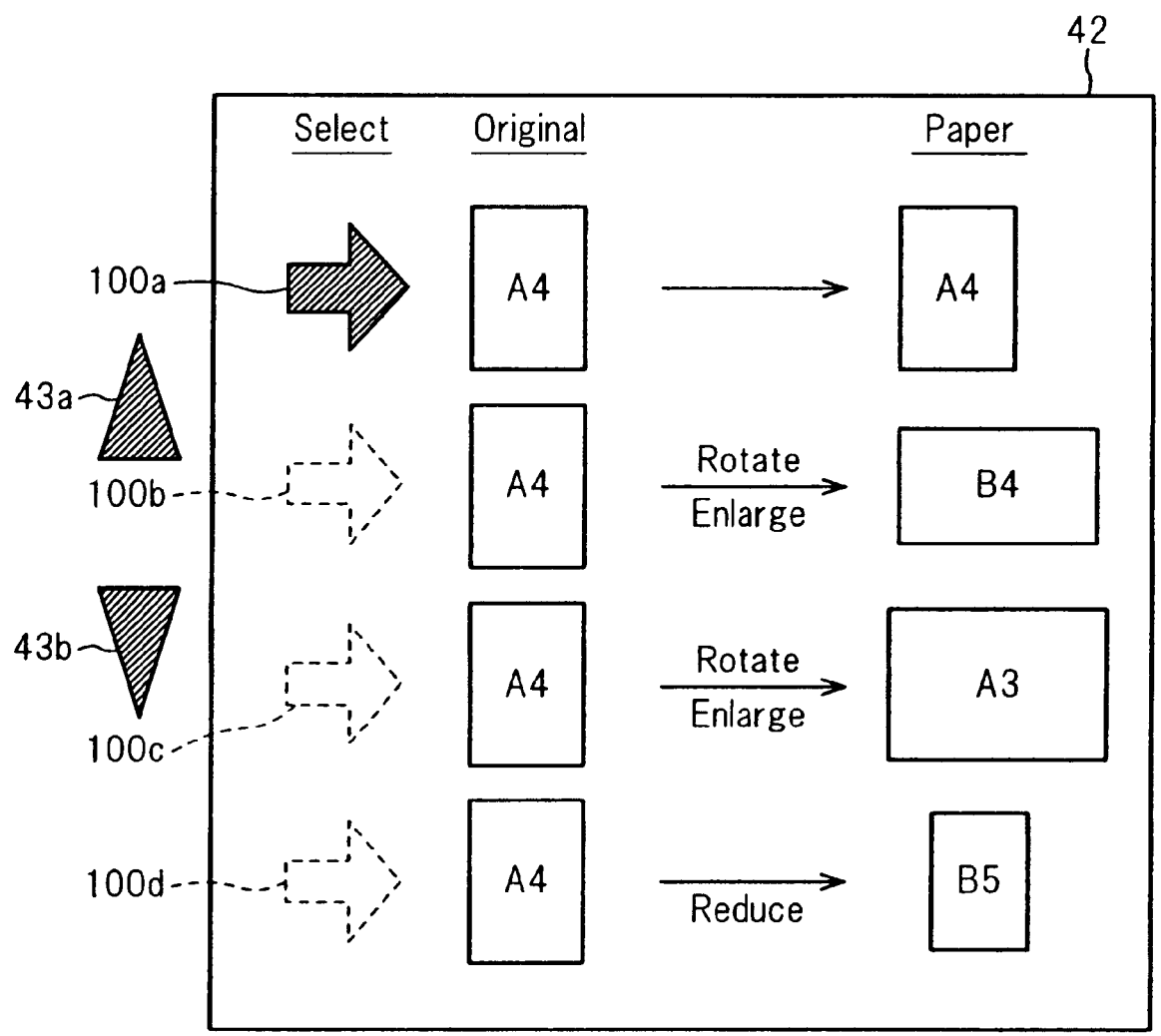
FIG. 8 is a diagram for illustrating the display state in a display panel of a copier having an operation control and input device in accordance with the second embodiment of the present invention.

FIG. 8 is a diagram for illustrating the display state in a display panel of a copier having an operation control and input device in accordance with the second embodiment of the present invention. In this operation control and input device according to this embodiment, controller 51 outputs display data to display panel 42, taking into account the detection result from the original size detecting sensor, one of sensor group 52. Specifically, the original size detecting sensor detects the original size and direction of placement of the original set on original table 11 and outputs the detection result to controller 51. Controller 51, based on the detection result input from the original size detecting sensor and the information as to use frequency read out from use frequency manager 54, determines the display order of the original size and paper size combinations to be displayed on display panel 42.

More specifically, controller 51 chooses only the combinations which have as their original size the detection result input from the original size detection sensor and displays them on display panel 42 in order of use frequency. For example, when an A4 size original is set on original table 11 with its length set in the front-to-rear direction, four combinations used most frequently, chosen from the combinations with A4 size original placed with its length set in the front-to-rear direction are displayed in display portion 42 in order of use frequency. Similarly to the example shown in FIG. 7, as scroll keys 43a and 43b are operated, the displayed position of arrow indicators 100a to 100d in display panel 42 and the display of original size and paper size combinations can be scrolled. For original size and paper size combinations other than isometric combinations, the zooming condition, enlargement or reduction as well as whether the image data should be rotated, is displayed between the pattern representing the original size and the pattern representing the paper size.

In the above way, in the operation control and input device in accordance with this embodiment, only the combinations selectable based on the size and direction of placement of the original set on original table 11 are displayed on display panel 42 in order of use frequency with no unselectable combinations displayed. Therefore, even if there are various possible original size and paper size combinations which can be selected in copying machine 10, only the original size and paper size combinations with which the copying operation of the original set on original table 11 can be carried out will be displayed on display panel 42 in order of use frequency, as the choices for the operator. Accordingly, it is positively possible to prevent an unselectable combination from being wrongly selected as well as to reduce the number of scrolling operations before the operator reaches the desired original size and paper size combination, thus enabling quick and easy choice of the operator's desired combination.

Figure 9:
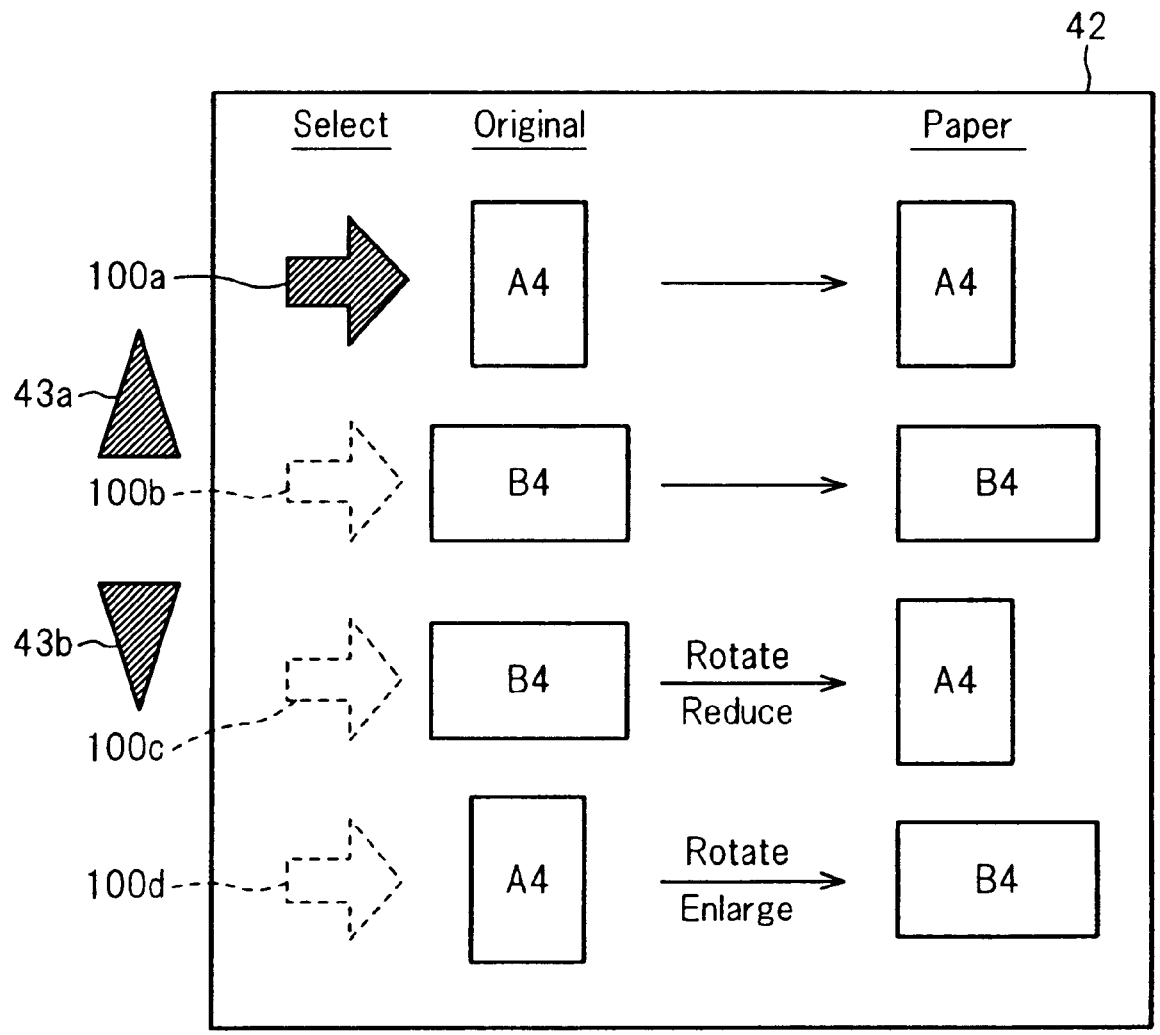
FIG. 9 is a diagram for illustrating the display state in a display panel of a copier having an operation control and input device in accordance with the third embodiment of the present invention.

FIG. 9 is a diagram for illustrating the display state on a display panel of a copier having an operation control and input device in accordance with the third embodiment of the present invention. In this operation control and input device according to this embodiment, controller 51 outputs display data to display panel 42, taking into account the detection result from the paper size detecting sensor, one of sensor group 52. Specifically, the paper size detecting sensor detects the sizes and directions of placement of sheets accommodated in multiple paper feed cassettes 25 mounted in paper feed portion 2 and outputs the detection result to controller 51. Controller 51, based on the detection result input from the paper size detecting sensor and the information as to use frequency read out from use frequency manager 54, determines the display order of the original size and paper size combinations to be displayed on display panel 42.

More specifically, controller 51 chooses only the combinations which have as their paper size the detection result input from the paper size detection sensor and displays them on display panel 42 in order of use frequency. For example, when a paper feed cassette 25 having A4 size paper held therein with its length set in the front-to-rear direction, a paper feed cassette 25 having B4 size paper held therein with its length set widthwise and a paper feed cassette 25 having B5 size paper held therein with its length set in the front-to-rear direction are set in paper feed portion 2, four combinations used most frequently, chosen from the combinations involving these paper sizes and storage directions of paper are displayed in display portion 42 in order of use frequency. Similarly to the example shown in FIG. 7, as scroll keys 43a and 43b are operated, the displayed position of arrow of arrow indicators 100a to 100d in display panel 42 and the display of original size and paper size combinations can be scrolled. For original size and paper size combinations other than isometric combinations, the zooming condition, enlargement or reduction as well as whether the image data should be rotated, is displayed between the pattern representing the original size and the pattern representing the paper size.

In the above way, in the operation control and input device in accordance with this embodiment, only the combinations selectable based on the sizes and directions of placement of the paper held in paper feed cassettes 25 mounted in the paper feed portion 2 are displayed on display panel 42 in order of use frequency with no unselectable combinations displayed. Therefore, even if there are various possible original size and paper size combinations which can be selected in copying machine 10, only the original size and paper size combinations with which the copying operation of the paper stored in the paper feed portion 2 can be carried out will be displayed on display panel 42 in order of use frequency, as the choices for the operator. Accordingly, it is positively possible to prevent an unselectable combination from being wrongly selected as well as to reduce the number of times of scrolling operations before the operator reaches the desired original size and paper size combination, thus enabling quick and easy choice of the operator's desired combination.

Figure 10:
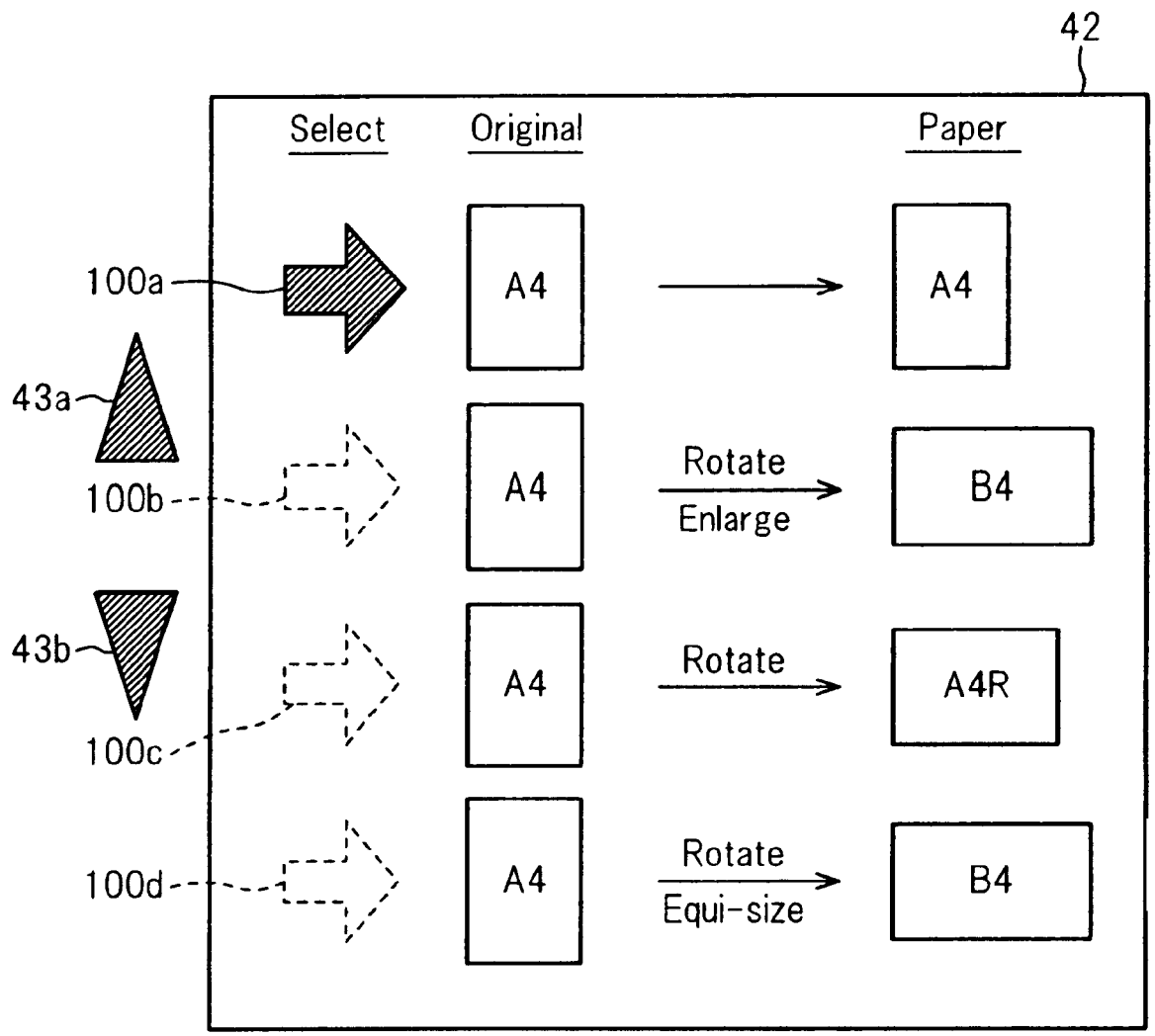
FIG. 10 is a diagram for illustrating the display state in a display panel of a copier having an operation control and input device in accordance with the fourth embodiment of the present invention.

FIG. 10 is a diagram for illustrating the display state in a display panel of a copier having an operation control and input device in accordance with the fourth embodiment of the present invention. In this operation control and input device according to this embodiment, controller 51 outputs display data to display panel 42, taking into account the detection results from the original size detecting sensor and paper size detecting sensor both included in sensor group 52. Specifically, the original size detecting sensor detects the original size and direction of placement of the original set on original table 11 and outputs the detection result to controller 51. And the paper size detecting sensor detects the sizes and directions of placement of sheets accommodated in multiple paper feed cassettes 25 mounted in paper feed portion 2 and outputs the detection result to controller 51. Controller 51, based on the detection results input from the original size detecting sensor and paper size detecting sensor and the information as to use frequency read out from use frequency manager 54, determines the display order of the original size and paper size combinations to be displayed on display panel 42.

More specifically, controller 51 chooses only the combinations which have as their original size the detection result input from the original size detection sensor and have as their paper size the detection result input from the paper size detection sensor and displays them on display panel 42 in order of use frequency. For example, when an A4 size original is set on original table 11 with its length set in the front-to-rear direction and a paper feed cassette 25 having A4 size paper held therein with its length set in the front-to-rear direction and a paper feed cassette 25 having A4 size paper held therein with its length set widthwise and a paper feed cassette 25 having B4 size paper held therein with its length set widthwise are set in paper feed portion 2, four combinations used most frequently, chosen from the combinations of A4 size original placed with its length set in the front-to-rear direction as the original size and these paper sizes and their storage directions as the paper size, are displayed in display portion 42 in order of use frequency. Similarly to the example shown in FIG. 7, as scroll keys 43a and 43b are operated, the displayed position of the arrow of arrow indicators 100a to 100d in display panel 42 and the display of original size and paper size combinations can be scrolled. For original size and paper size combinations other than isometric combinations, the zooming condition, enlargement or reduction as well as whether the image data should be rotated, is displayed between the pattern representing the original size and the pattern representing the paper size.

In the above way, in the operation control and input device in accordance with this embodiment, only the combinations selectable based on the size and direction of placement of the original set on original table 11 and based on the sizes and directions of placement of the paper held in paper feed cassettes 25 mounted in paper feed portion 2, are displayed on display panel 42 in order of use frequency with no unselectable combinations displayed. Therefore, even if there are various possible original size and paper size combinations which can be selected in copying machine 10, only the original size and paper size combinations with which the copying operation of the original set on original table 11 can be carried out using the paper stored in paper feed portion 2 will be displayed on display panel 42 in order of use frequency, as the choices for the operator. Accordingly, it is positively possible to prevent an unselectable combination from being wrongly selected as well as to minimize the number of scrolling operations before the operator reaches the desired original size and paper size combination, thus enabling quick and easy choice of the operator's desired combination.

Figure 11A:
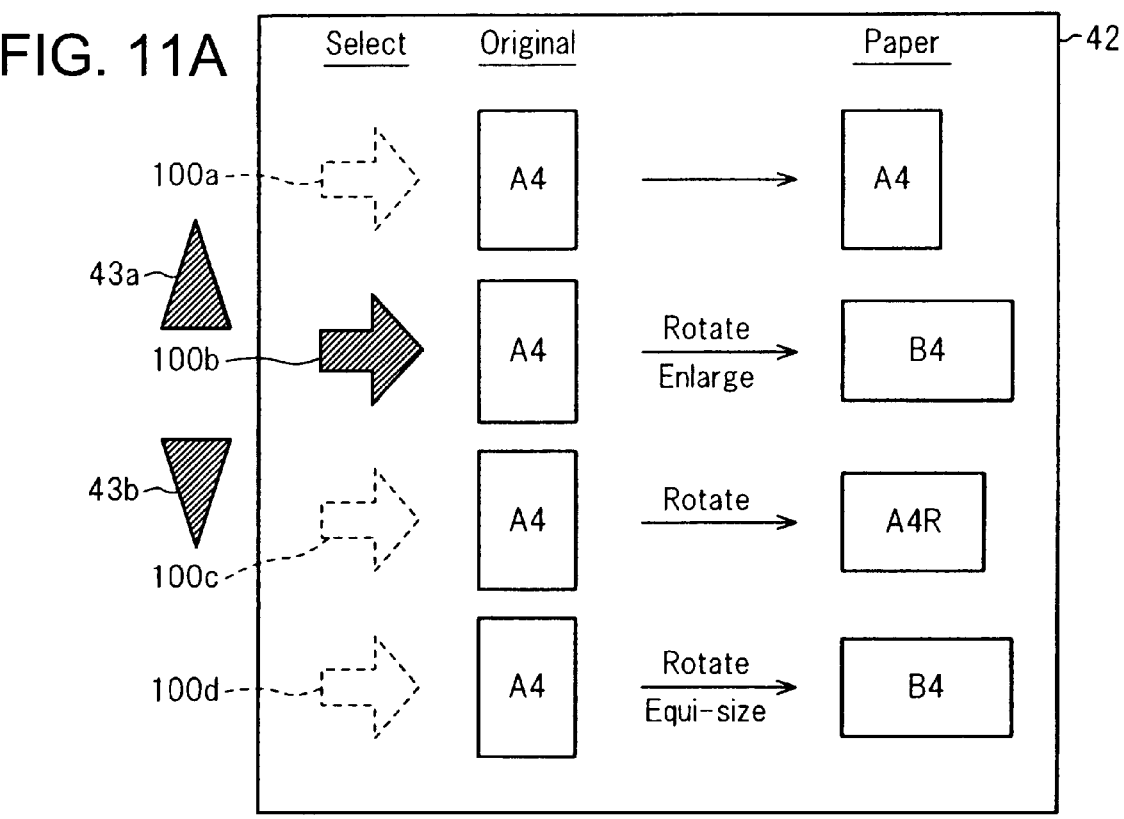
FIGS. 11A and 11B are diagrams for illustrating the display states in a display panel of a copier having an operation control and input device in accordance with the fifth embodiment of the present invention.
Figure 11B:
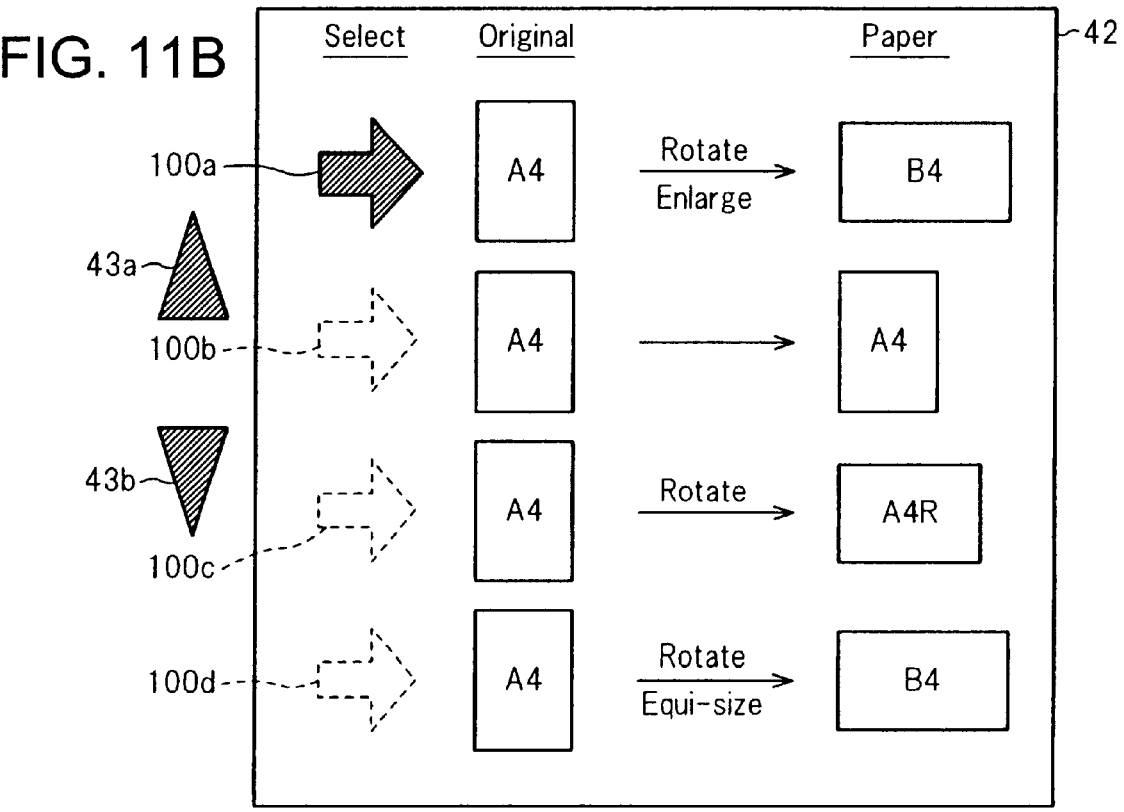

FIGS. 11A and 11B are diagrams for illustrating the display states in a display panel of a copier having an operation control and input device in accordance with the fifth embodiment of the present invention. In the copier according to this embodiment, controller 51 or use history manager 54 has a previous combination storage for storing the combination of the original size and paper size in the previous copying operation. When a copying operation has been completed, controller 51 renews the previous combination storage and stores the original size and paper size combination of the last copying operation into the storage. When an original is set on original table 11 and the detection result from the original size detecting sensor, i.e., the original size inclusive of its direction of placement, is input, controller 51 judges whether the original size of the detection result coincides with the original size involved in the combination stored in the previous combination storage. If the size of the original placed on original table 11 is in agreement with that stored in the previous combination storage, the displayed order of the combination in the display panel 42 is promoted so that the use frequency number as to that combination is set to '1' in use history manager 54, for example.

Specifically, in the case where a paper feed cassette 25 having A4 size paper held therein with its length set in the front-to-rear direction and a paper feed cassette 25 having A4 size paper held therein with its length set widthwise and a paper feed cassette 25 having B4 size paper held therein with its length set widthwise are set in paper feed portion 2, if an A4 size original is placed on original table 11 with its length set in the front-to-rear direction, the four combinations shown in FIG. 11A, for example, are displayed in display panel 42, based on the use frequencies stored in use history manager 54. In this situation, suppose a copying operation of an A4 size original with its length set in the front-to-rear direction to create a B4 size widthwise paper copy by rotating and enlarging the original image has been preformed, as the operator's choice. After completion of this copying operation, if an A4 size original is set on original table 11 with its length set in the front-to-rear direction, display panel 42 displays at the top the combination for duplicating the image of an A4 original placed with its length set in the front-to-rear direction to create a B4 size widthwise paper copy by rotation and enlargement of the original with its selected state.

In the above way, in the copier having the operation control and input device according to this embodiment, if a copying operation of the same original size and paper size combination as the previous one needs to be effected, it is possible to make quick selecting control relating to the copy magnification setup even if the original size and paper size combination is used less frequently. Accordingly it is possible to improve the operativity in copying operation.

The pervious combination storage may be configured so as to store the original size and paper size combinations for the last copying operations for the different original sizes. Also the previous combination storage may be configured to clear the stored content after a lapse of a predetermined time designated previously.

The present invention have the following effects:

First, a multiple number of original size and paper size combinations are displayed in the display portion based on the modifying operation of the display content via the operation control portion and based on the use history of individual combinations. When the operator selects one from the combinations displayed in the display portion using the operation control portion so as to set up copying conditions in conformity with the selected combination, it is possible to select the desired original size and paper size combination from the multiple number of combinations displayed in the display portion, thus enabling easy setup of the copy magnification and the paper size. Further, since the multiple number of original size and paper size combinations displayed in order of the possibility of being selected based on the use history of the individual combinations, this feature facilities quick selection of the desired combination, thus enabling quick and easy choice of the operator's desired combination even if there are various selectable original size and paper size combinations.

Since a multiple number of original size and paper size combinations are displayed in the display portion in order of use frequency, based on the modifying operation of the display content via the operation control portion, it is possible to set the operator's desired combination quickly and easily by appropriate control of the operation control portion even if there are various selectable original size and paper size combinations.

Further, since, among the selectable original size and paper size combinations, only the combinations having the original size involved in the copying operation are displayed with no unselectable combinations displayed, this feature contributes to simplifying the selection and setup via the operation control portion even if there are various selectable combinations.

Next, since, among the selectable original size and paper size combinations, only the combinations involving the paper sizes capable of being used for the copying operation are displayed with no unselectable combinations displayed, this feature contributes to simplifying the selection and setup via the operation control portion.

A multiple number of selectable original size and paper size combinations are displayed in the display portion in order of use frequency. That is, among the multiple number of selectable size combinations, the combinations which have been frequently used are displayed in the display portion in order of possibility of being selected. Therefore, the number of times of operating the operation control portion for displaying the desired combination in the display portion can be reduced, whereby it is possible to simplify the modifying operation of the display content via the operation control portion.

Finally, the combination of the last copying operation is displayed in the display portion in preference to other combinations even if the combination is used less frequently. Therefore, if the operator makes multiple times of copying operations in a row, the combination is displayed at the top in the display portion as the candidate of the original size and paper size combination to be used in the second and following copying operations, regardless of the use frequency of the combination. This feature enables the operator to perform quick selection and control of the desired combination.

What is claimed is:

1. An operation control and input device for a copier, comprising:

a display portion for displaying a plurality of original size and paper size combinations;

an operation control portion for receiving modifying operations of a display content in the display portion and for receiving a selection control of one original size and paper size combination from the plural combinations; and a controller which, based on a modifying operation of the display content via the operation control portion and based on use history for individual combinations stored beforehand, displays original size and paper size combinations, in order of the possibility of being selected, and sets up the copying conditions based on the selection control by means of the operation control portion.

2. The operation control and input device for a copier according to claim 1, wherein the controller displays a predetermined number of combinations selected from multiple original size and paper size combinations, in scrolling manner, based on the modifying operation of the display content via the operation control portion.

* * * * *